(12) United States Patent
Lessley (10) Patent No.: US 6,971,419 B1
(45) Date of Patent: Dec. 6, 2005

(54) PIPING RETENTION WITH INTEGRATED COMPONENTS FOR PREVENTION OF VAPOR EMISSION OF SUBTERRANEAN STORAGE TANKS

(75) Inventor: Michael Lessley, Glendale, CA (US)

(73) Assignee: Triangle Environmental, Inc., Burbank, CA (US)

( * ) Notice: Subject to any disclaimer, the term of this patent is extended or adjusted under 35 U.S.C. 154(b) by 0 days.

(21) Appl. No.: 10/445,565

(22) Filed: May 22, 2003

Related U.S. Application Data (60) Provisional application No. 60/383,383, filed on May 24, 2002.

(51) Int. Cl.[7] .............................................. B65B 31/00
(52) U.S. Cl. .............................. 141/86; 141/59; 141/98
(58) Field of Search ............................. 141/59, 65, 86, 141/87, 88, 98; 405/53; 285/197, 199

(56) References Cited

U.S. PATENT DOCUMENTS

| | | | | |
|---|---|---|---|---|
| 2,714,037 A | * | 7/1955 | Singer et al. ................ | 239/201 |
| 5,564,858 A | * | 10/1996 | Bravo .......................... | 405/52 |
| 6,267,156 B1 | * | 7/2001 | Argandona .................. | 141/86 |
| 6,644,418 B2 | * | 11/2003 | Haga ............................ | 173/48 |

* cited by examiner

Primary Examiner—Justine R. Yu
Assistant Examiner—Peter deVore
(74) Attorney, Agent, or Firm—John E. Wagner; Robert C. Smith (57) ABSTRACT

A piping system for adding fuel to underground storage tanks includes a fill piping system and a vapor return piping system designed to prevent fuel spills and leakage of fuel vapors into the atmosphere. Fuel and vapor leakage are avoided by eliminating most of the threaded joints in each such piping assemblies by welding them into joint-free unitary stainless steel assemblies. A brace bar extends between the fill and vapor return piping systems and is secured to octagonal side flats on both assemblies such that the octagonal members cannot rotate unless the brace bar is removed.

Annular synthetic rubber spill buckets are selectively inserted into each piping system to catch spills and prevent fuel from leaking near the tank or vapor from leaking out of the vapor recovery system into the atmosphere. In another modification, the spill bucket is used only on the fill piping system.

13 Claims, 9 Drawing Sheets

Fig. 1

PRIOR ART

PIPING RETENTION WITH INTEGRATED COMPONENTS FOR PREVENTION OF VAPOR EMISSION OF SUBTERRANEAN STORAGE TANKS

REFERENCE TO RELATED APPLICATION

This Non-Provisional patent application claims benefit of U.S. Provisional Patent Application Ser. No. 60/383,383 filed May 24, 2002, and hereby claims the benefit of the embodiments therein and of the filing date thereof.

BACKGROUND OF THE INVENTION

In the last 25 years, substantial progress has been made in reducing or eliminating contamination of the atmosphere by hydrocarbons resulting from the use of fossil fuels for power generation and vehicle propulsion. Some of the examples of progress are in the introduction of catalytic converters for vehicles and the vapor recovery systems for use in vehicle fuel delivery systems for service stations. The result has been a marked improvement in the quality of air in many geographic areas.

There is one area of the system ranging from the production of hydrocarbon fuels to the combustion of the fuels in vehicles that has remained to be addressed and solved. That area is in the process of transferring hydrocarbon fuels from a transporting vehicle to a storage tank, such as the underground storage tanks found in the conventional filling stations.

Whenever an underground tank is less than full, a concentration of fuel vapor exists in the tank above the level of liquid fuel. This is similar to the situation in vehicle fuel tanks. It has been known for a number of years that storage tanks, particularly underground storage tanks before fueling from a fuel transport truck, will have this significant concentration of fuel vapors to be captured. These vapors are displaced as the tank is refilled with fuel. Often the vapors are recovered but more often than not, some spillage occurs during the fueling operation.

The act of connecting a delivery hose to the fill opening in the storage tank at the ground level sometimes result in less than a perfect seal and vapors leak out and enter the atmosphere through seals or joints in either the delivery system or vapor recovery system. It is, therefore, an object of this invention to improve fuel delivery systems by minimizing or eliminating sources of vapor leakage during the fueling process and throughout the life of the storage tank system.

Another object of this invention is to provide a fuel delivery system which insures freedom from unintended partial loosening of threaded connections in the system during the attachment and removal of fueling nozzles from a fueling truck.

One further object of this invention is to provide a simple, effective lock of the fueling intake and exhaust piping of an underground storage tank to insure their vapor integrity at all times.

One further object of this invention is to provide a spill recovery attachment to each fill and vapor recovery pipe to catch any liquid spills and allow its immediate replacement into the storage tank or removal without vaporization.

BRIEF DESCRIPTION OF THE INVENTION

Faced with this state of the art and the unfulfilled objectives, I determined that a principal cause of vapor emission during the storage tank process was the presence of multiple joint couplings in the filler stacks or conduits between the riser pipes, which extend upward from a subterranean storage tank, to a connector tube, and a fill adapter which joins the nozzle of the tank filling hose.

Also, if any spillage occurs, there is no effective way to capture the spillage, which is slightly below grade level and may be contaminated once it contacts the subterranean environment, which may be soil or gravel. The resulting spillage can evaporate into the atmosphere or contaminate the soil surrounding the tank. To solve this problem, I contemplated the addition of a spill bucket, which surrounds the fill pipe assembly to catch any spillage and to allow the spillage to be captured without either being contaminated or contaminating the soil surrounding the storage tank. The captured spillage may be reclaimed and dispensed into the tank or otherwise disposed of under environmentally approved procedures.

I have also eliminated most of the threaded joints in both the filler and return piping assemblies by welding each into a joint-free unitary stainless steel assembly.

I also discovered that the possibility of loosened joints in the fill system can be eliminated by bracing the fill and vapor return piping systems together with a brace bar which is secured to both pipes to prevent the loosening of either pipe assembly without first removing the brace bar.

BRIEF DESCRIPTION OF THE DRAWINGS

This invention may be more clearly understood from the following detailed description and by reference to the drawing, is which.

DETAILED DESCRIPTION OF THE INVENTION

Figure 1:
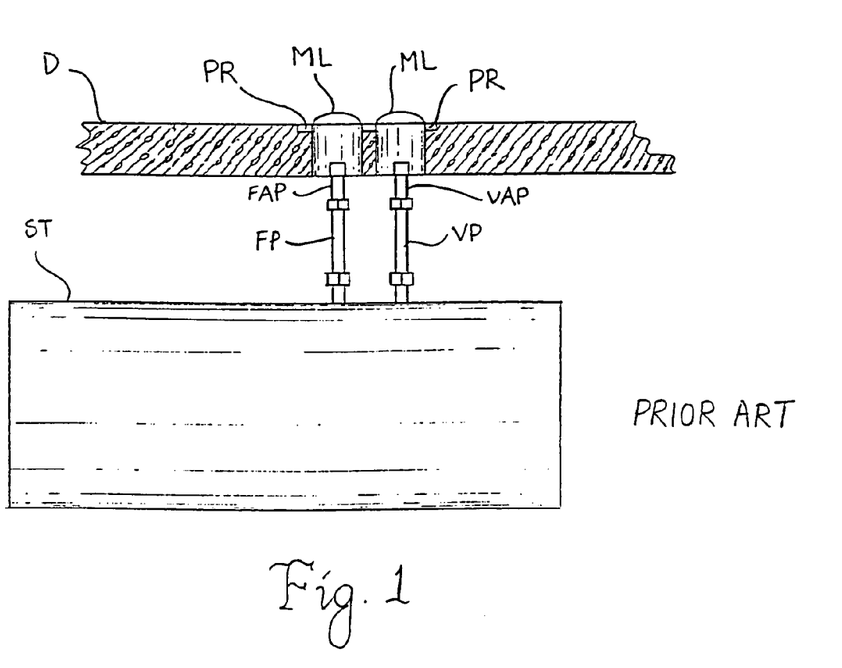
FIG. 1 is vertical elevational view of a typical prior art installation of a subterranean storage tank for a filling station including the filling and vapor return piping.
Figure 1A:
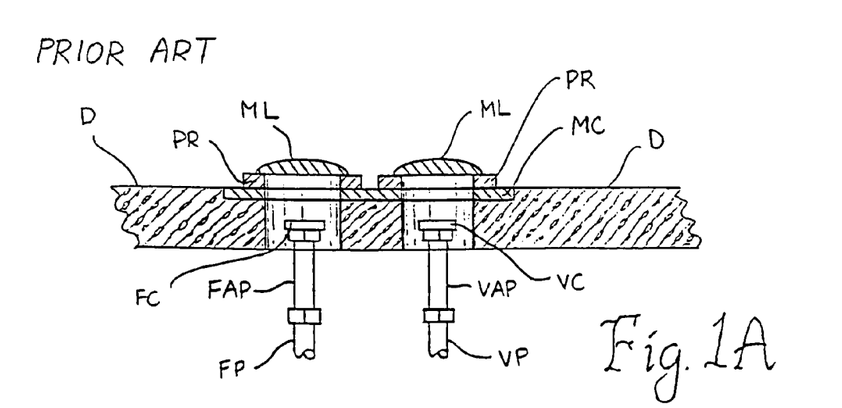
FIG. 1A is an enlarged fragmentary view of a part of the system of FIG. 1.

For an understanding of the state of the art before this invention, reference is now made to FIGS. 1 and 1A in which a fuel storage tank ST is installed below a concrete deck D of a service or fuel filling station. The tank ST is permanently located and is accessible by a pair of upstanding pipes, a fill pipe FP, and a vapor recovery pipe VP of lengths which vary from installation to installation to reach a standard height to join a fill assembly pipe FAP and a vapor recovery assembly pipe VAP (FIG. 1A), each of which extend upward to the surface of the deck D. The two pipes, FP and VP, are independent and each are customarily connected to the tank ST and to the fill and vapor recovery connectors FC and VC by one or more threaded connections. The openings in the deck are closed by a manlid ML set in a plough ring PR above a manway cover MC. There are at least two threaded connections between the storage tank ST and the fuel nozzle coupling FC of the fuel filler assembly and the vapor outlet coupling VC of the vapor collection line. These couplings, FC and VC, are standards which are designed to match the fueling nozzles and vapor recovery nozzles of fueling trucks in accordance with standards established by such agencies as the California Air Research Board. The reference letters are used to designate existing components in a service or filling station before installation of this invention.

In the steps of engaging and disengaging the nozzles from the fueling truck, there is a danger of loosening one or more of the threaded joints in the piping. Likewise, there is no provision for spill collection in the event of leakage at the fill line or overfill at the vapor recovery line. Both of these problems are eliminated in accordance with this invention.

Figure 2:
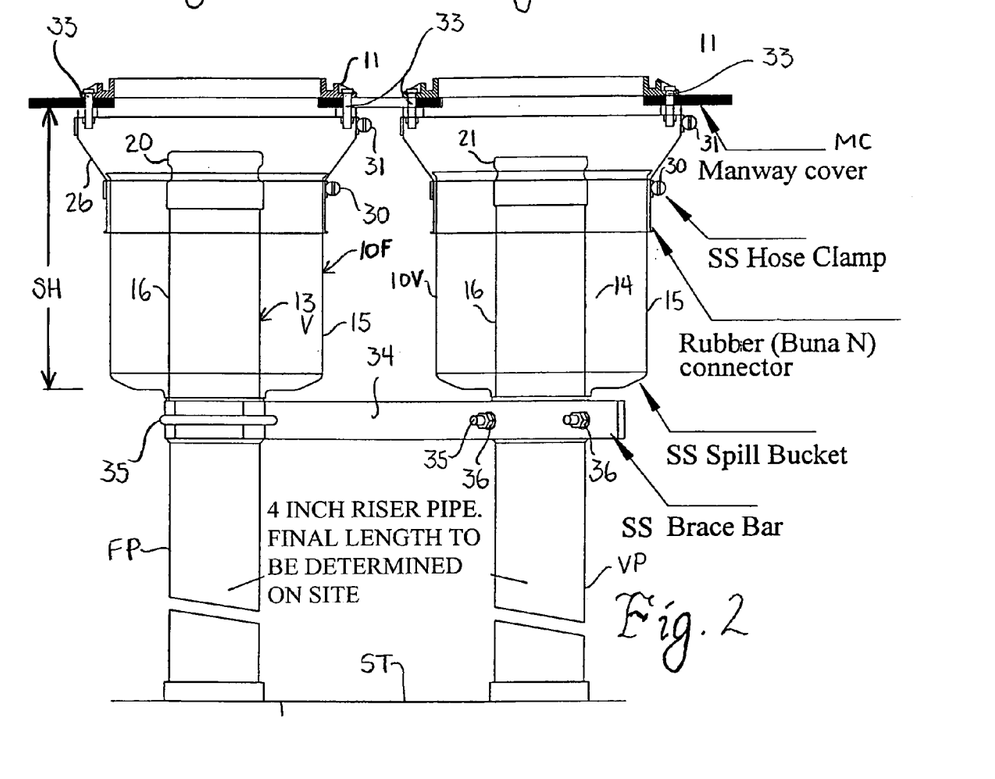
FIG. 2 is a side elevational view of a filling assembly in accordance with this invention.

Now referring to FIGS. 2 and 3, for an enlarged view of an installation of a complete fueling and vapor recovery system in accordance with this invention. FIG. 2 shows a side elevational view of the complete assemblies 10F and 10V with the internal components shown in phantom, while FIG. 3 shows a top plan view of the plough ring 11 and manlid 12 of FIG. 2 as seen by the fueler before beginning fueling operations.

Figure 3A:
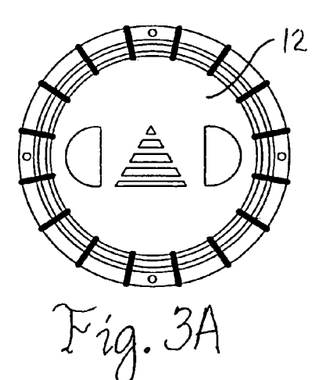
FIG. 3 is a top plan view of the filling assembly as seen above ground level showing the plough ring and man lids in place.
Figure 3B:
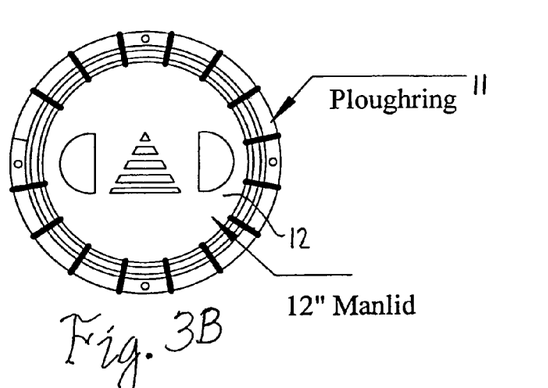

As seen in FIG. 2, a pair of fueling system assemblies, designated generally by numerals 10F and 10V, with the fuel assembly designated as 10F and the vapor recovery assembly as 10V, each extend up to and are attached to the manway cover MC at the top surface of the fueling location of the filling or service station. Each assembly has a special plough ring 11 and manlid 12 of FIGS. 3A and 3B which close the fueling location when not in use for refueling the storage tank ST, not shown in FIG. 2, but represented by the line designated ST. Risers or fill pipes FP and vapor pipe VP extend upward from the storage tank ST to a standard height SH which is equal to the height of the assemblies 10F and 10V at the bottom of the manway cover MC for standardization at each installation.

Figure 4:
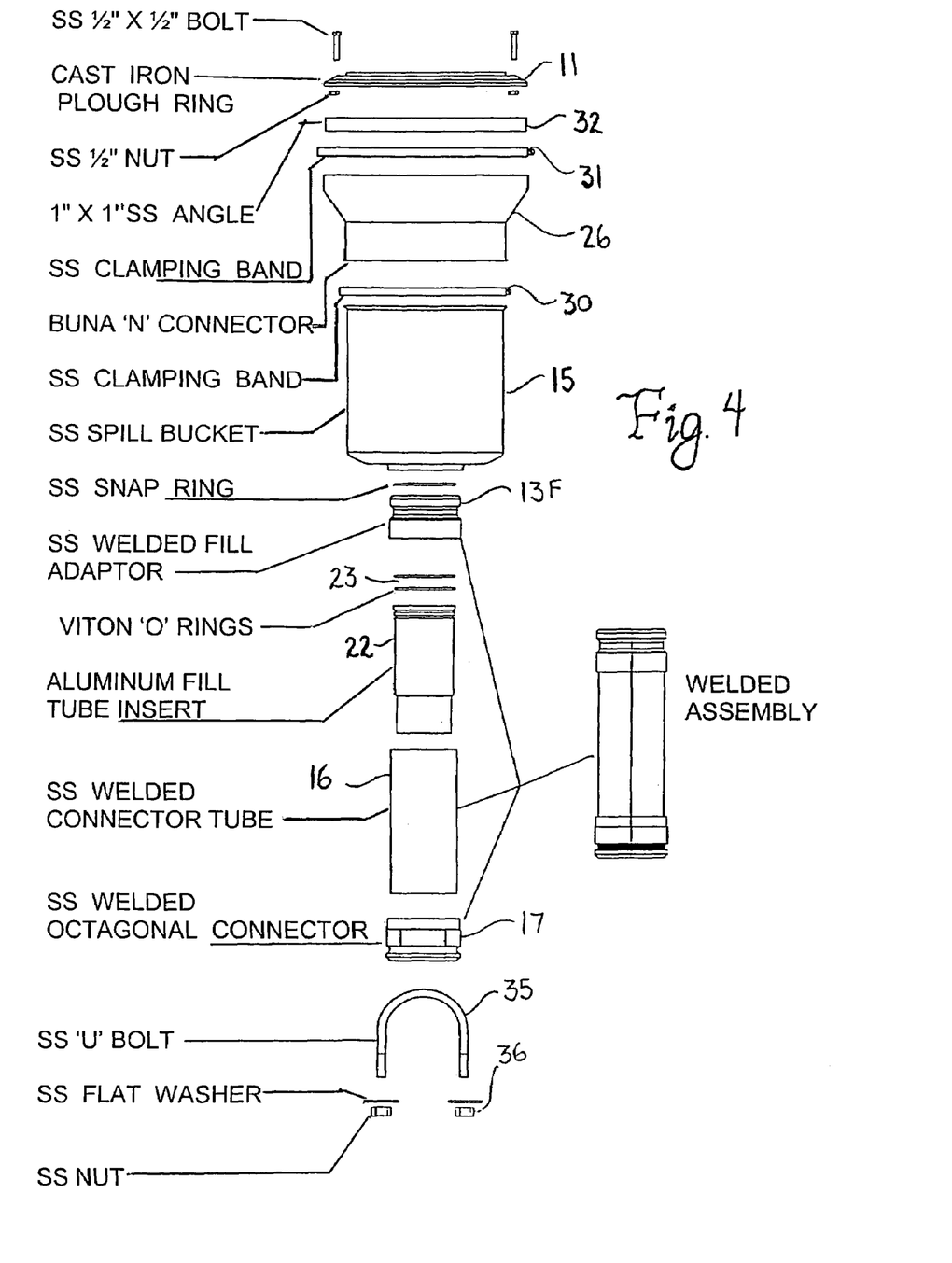
FIG. 4 is an exploded view of a fill assembly of FIG. 2 with a portion of the welded assembly further exploded for clarity.
Figure 5:
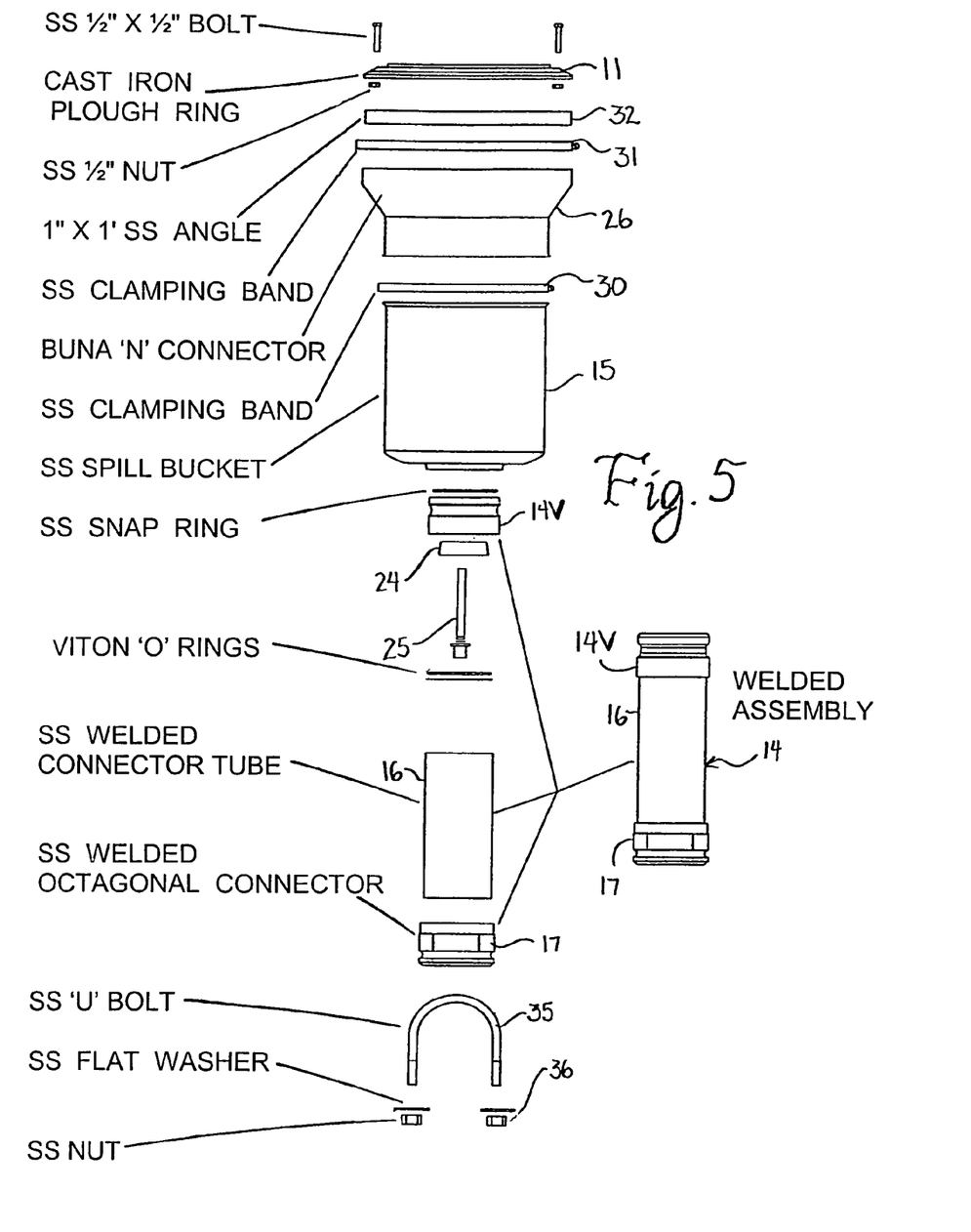
FIG. 5 is an exploded view of a vapor assembly in accordance with this invention with a portion of the welded assembly further exploded for clarity.
Figure 6:
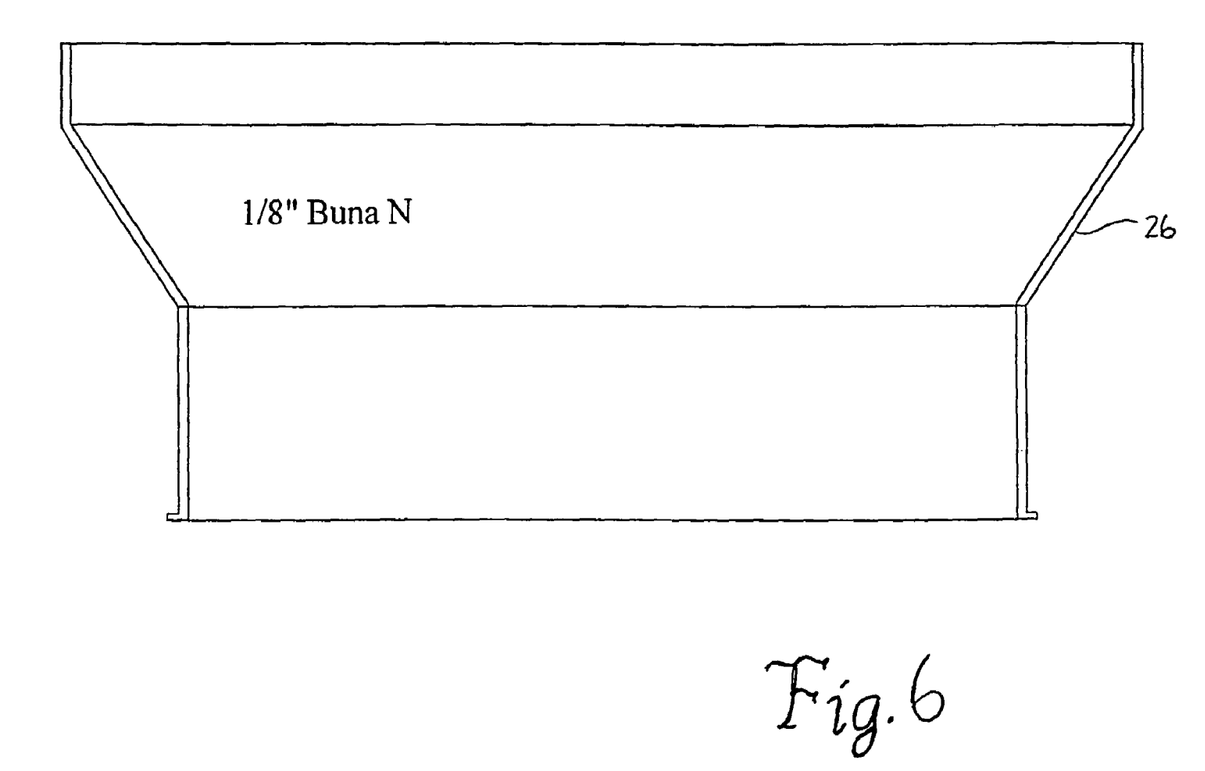
FIG. 6 is a vertical diametrical sectional view of the rubber connectors of FIGS. 4 and 5.
Figure 8:
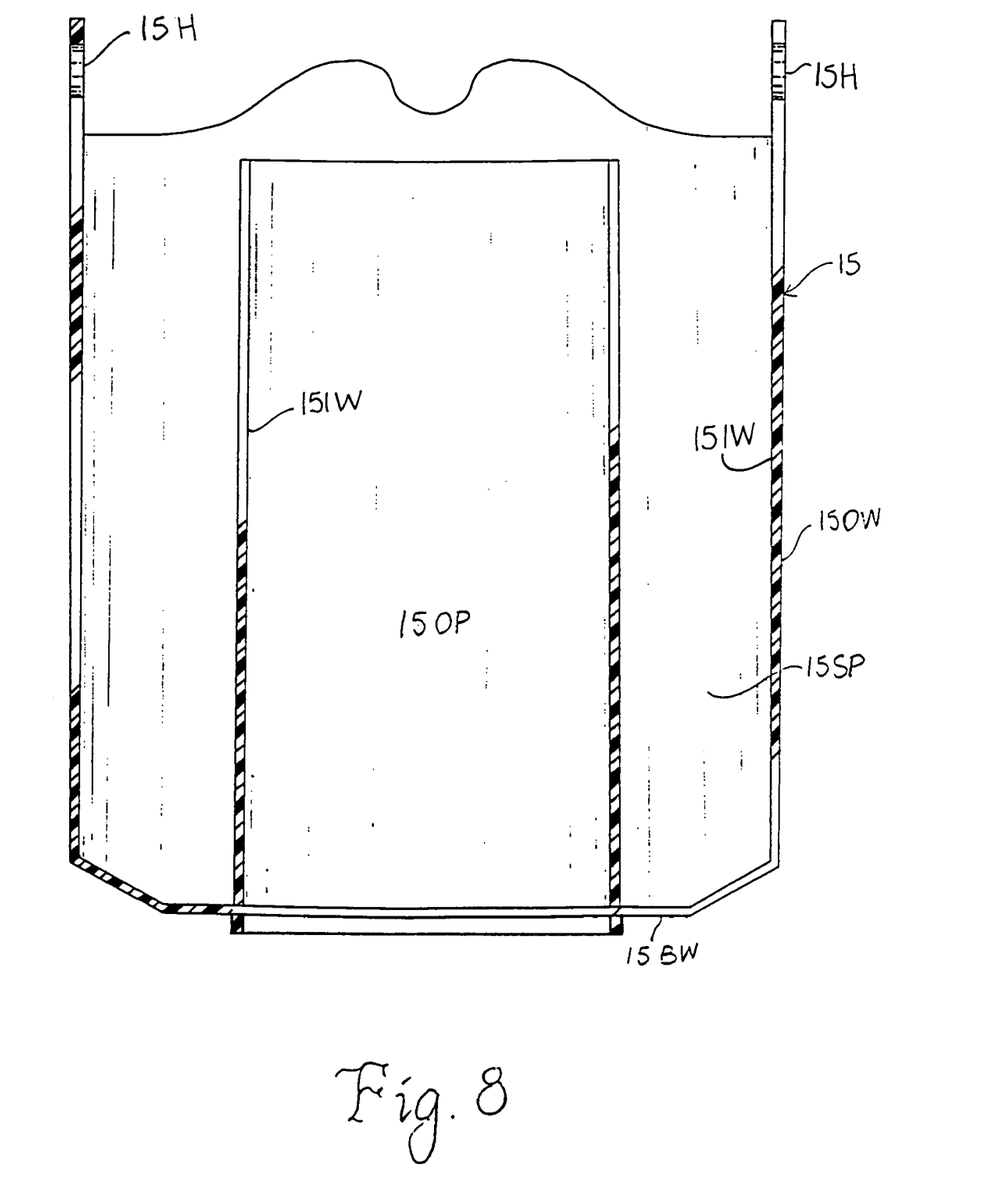
FIG. 8 is a vertical diametrical sectional view of the spill bucket of FIGS. 4 and 5.
Figure 10A:
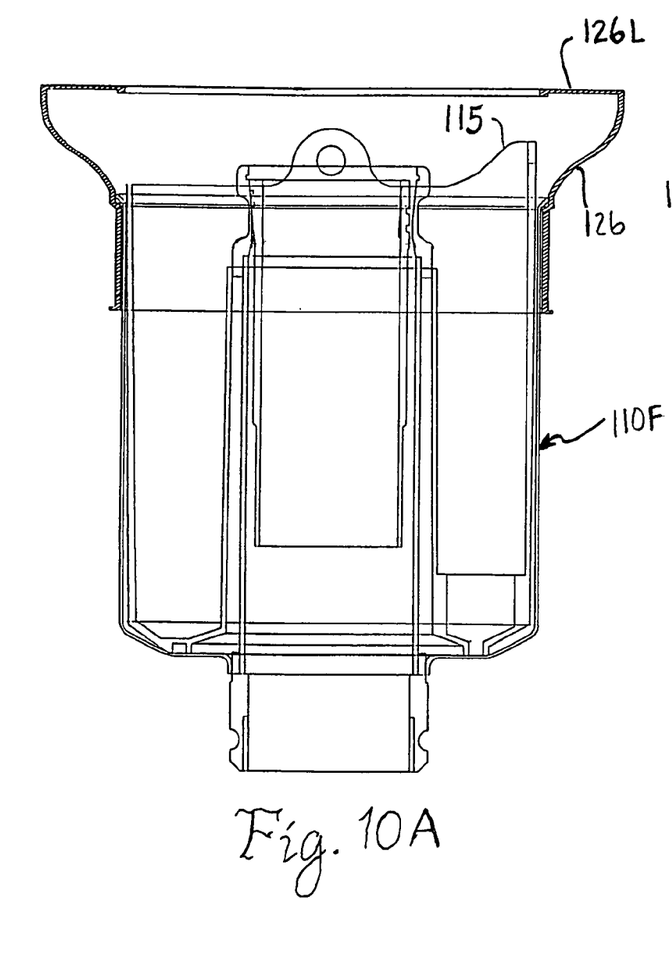
FIGS. 10A and 10B are vertical sectional views of alternate embodiments of the fill and vapor assemblies ready for installation and locking into position by the addition of the brace bar of FIG. 9.
Figure 10B:
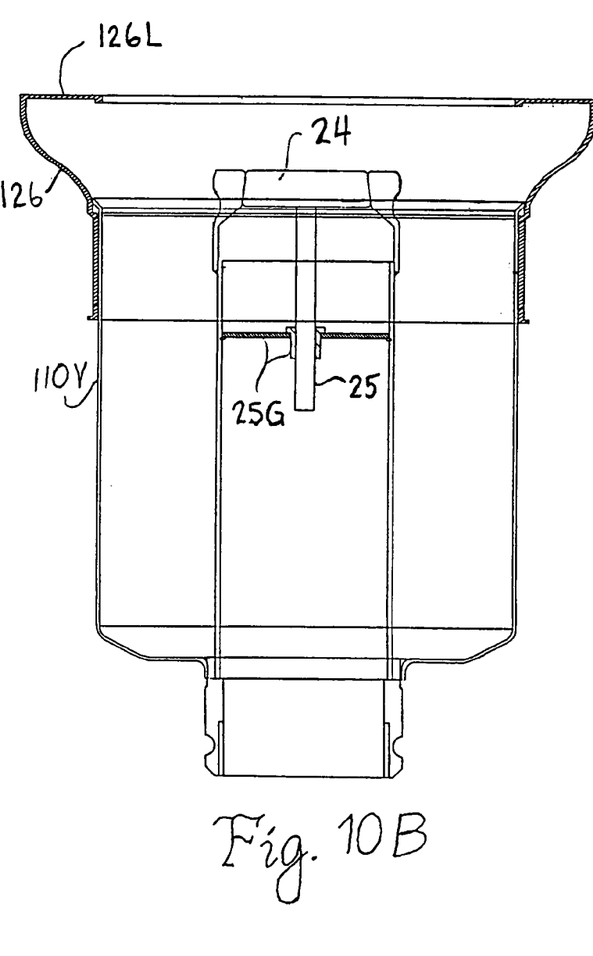

At the upper ends of the fill pipe FP and vapor pipe VP is a unitary welded assembly 13 or 14, best seen in FIGS. 4 and 5, each visible in phantom, within a respective spill bucket 15. Each spill bucket, best seen in FIGS. 8 and 10, is annular in shape and encircles its respective assembly 13 or 14 to capture any liquid fuel which might be spilled in the fueling operation. The spill buckets 15, including an inner wall 15 IW forming an internal sleeve portion shown in FIG. 8, and defining an inner opening 15 IO, as seen in 10A, will allow the bucket 15 to slide over the assemblies 13 or 14 and remain in place between fueling operations.

FIG. 2 also shows the presence of brace bar 34, which is a simple flat stainless steel strap with four holes for receiving a pair of U-bolts 35 and their securing nuts 36, and optional washers.

Figure 7:
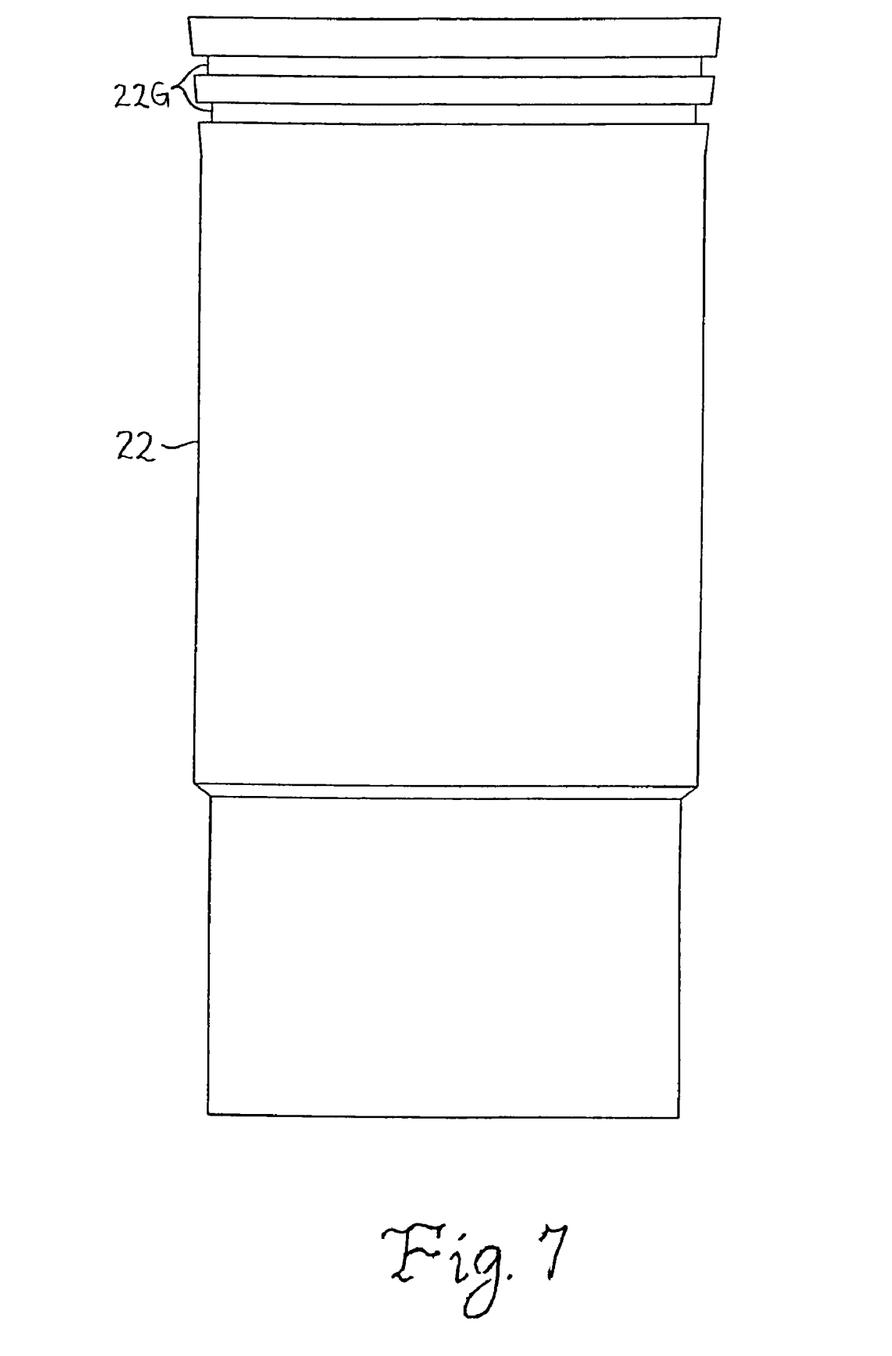
FIG. 7 is an enlarged side elevational view of the fill tube insert of FIG. 4.

Now referring additionally to FIGS. 4 and 5, the assemblies 13 and 14 each include a stainless steel welded octagonal connector 17 which engages and seals with the respective fitting, unshown in FIG. 2 at the top of the existing fill pipe FP or VP, and will normally remain in place for the useful life of the storage tank ST. The entire assemblies 10F and 10V of FIG. 2 may be easily changed in accordance with the procedure described below. The remainder of the unitary assemblies 13 and 14, each include a welded connector tube 16 and a welded adapter, a fill adapter fitting 20 for the fill assembly 13F and a vapor recovery adaptor fitting 21 for the vapor recovery assembly 14V. The fill assembly 13F includes an internal anodized aluminum fill tube insert 22 with O-ring grooves 22G of FIG. 7 and associated O-rings 23, preferably of Viton™ material, a fluroelastomer of the DuPont Fluroproducts, Buffalo, N.Y., for fuel resistance. The vapor recovery assembly 14V of FIG. 5 includes similar O-ring seals 23 as well as a check valve 24 and guide 25 as a vapor seal. The unitary assemblies 10F and 10V may also be produced by investment casting from stainless steel.

As shown in FIGS. 4 and 5, overlying the spill buckets 15 of each of the assemblies 13V and 14V are funnel-like, flexible connectors 26 with lower end clamping bands 30 and end bank 31, to secure the connectors 26 to their spill bucket 15 at their lower opening, and to a ring designated as a 1 inch by 1 inch angle 32 to secure the connector 26 to the plough ring 11 by bolts 33.

Figure 9:
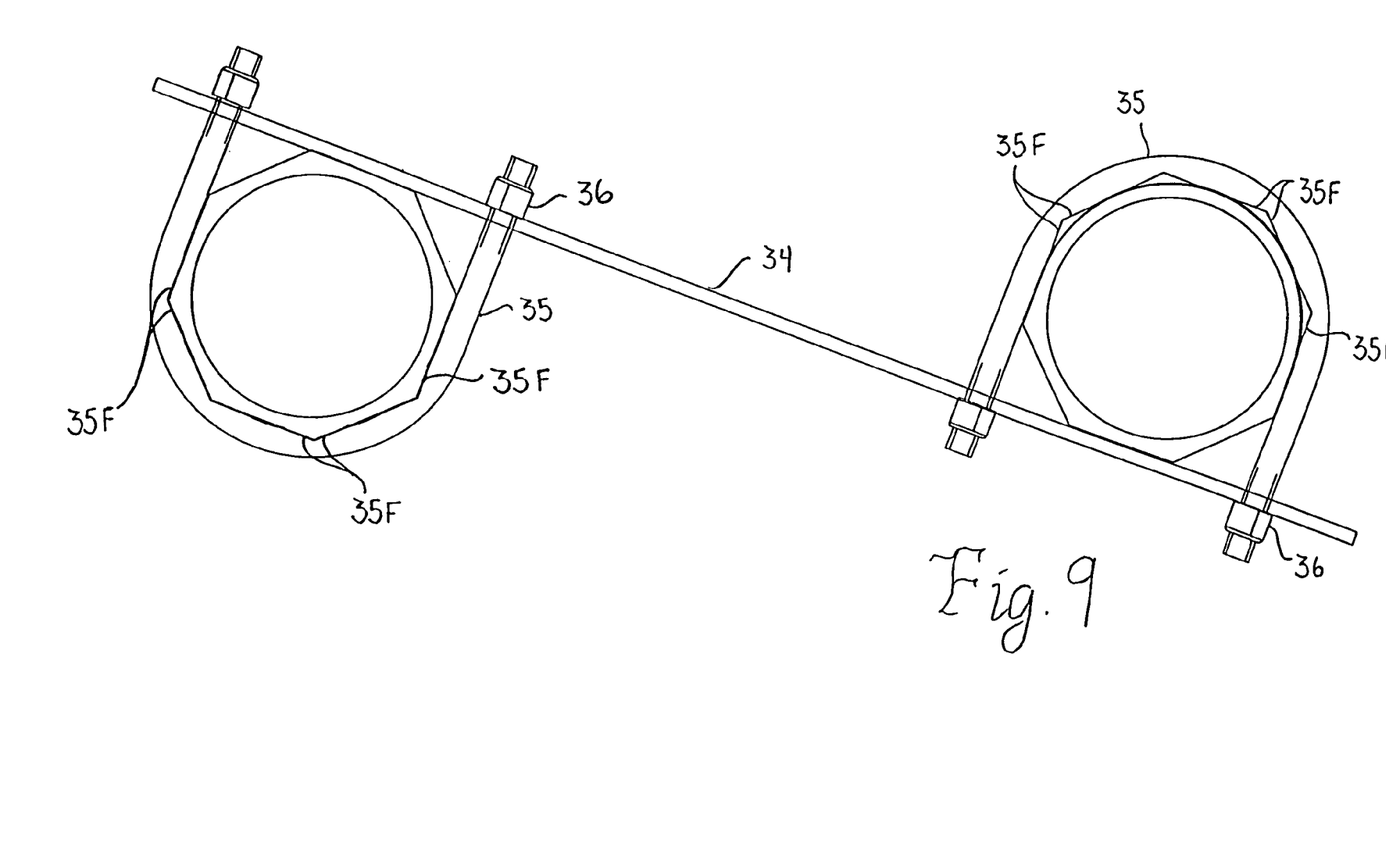
FIG. 9 is a top plan view showing a correct method of securing the brace bar of FIGS. 4 and 5 to the piping assemblies of this invention.

The brace bar 34 of FIG. 2 may best be seen in FIG. 9, viewed from the top. The U-bolts are preferably specially designed with octagonal flats 35F to match the octagonal shape of either the fill side or the vapor recovery side flats on the octagonal welded connectors 17 found at the bottom of each of the assemblies 10F and 10V. When attached, as shown in FIG. 9, none of the threaded connectors TCP may be loosened without first removing the brace bar 34. Likewise, no threaded connection to the storage tank ST may be inadvertently loosened while the brace bar 34 is in place. This eliminates a possible source of vapor leakage from the tank ST. Other coupling devices may be used, but the brace bar and U-bolts are simple and effective.

Reference is now made to FIG. 8, which shows the spill bucket 15 and may be seen with its outer wall 15 OW, its inner wall 15 IW and its bottom wall 15 BW which define the spill capture chamber 15 SP. Within the inner wall is the opening 15OP through which the welded assembly 13 extends at all times except when some spillage has occurred and it is time to slip the spill bucket up by its bail holes 15 FH for recovery and disposal of the fuel which otherwise would evaporate into the atmosphere. After removing the otherwise spilled fuel, the bucket is returned to its normal position surrounding its unitary welded assembly 13F or 14V, as the case may be.

FIGS. 10A and B are vertical sectional views, partly in phantom, of slightly modified assemblies 13F and 14V of FIG. 2. In this embodiment, 110F and 110V, flexible polymer materials connectors 126 each have a rounded form rather than an angular form of their counterparts 26 and a top lip 126L. The vapor recovery assembly is lacking a spill bucket, but the check valve 24, its guide 25 on the guide support 25G are shown. These components are also present, but not shown, in FIGS. 2, 4, and 5.

Altogether, the several features of this invention operate to minimize or eliminate several sources of possible atmospheric contamination related to the filling operation of subterranean fuel storage tanks. The same assemblies are fully effective to be used with aboveground tanks, as well, if such is the need.

The number of threaded and sealed joints has been significantly reduced by the integral welded design of the assemblies 13 and 14, which connects the fill and vapor riser pipes FP and VP of the subterranean tank ST. In a typical installation, as many as four threaded joints have been eliminated from each riser. The problem of inadvertent loosening of any threaded connection during filling has also been eliminated by the presence of the brace bar 34. Also, any spillage during filling is caught by either one of the spill buckets recovered into a sealed container and is not allowed to enter the atmosphere or the groundwater. As a result, the process of tank filling has been significantly improved.

The above-described embodiments of the present invention are merely descriptive of its principles and are not to be considered limiting. The scope of the present invention instead shall be determined from the scope of the following claims including their equivalents.

I claim:

1. In a piping system for an underground storage tank from a fill adapter on the surface including a fuel conduit extending from the tank to said fill adapter, said fuel conduit including a riser pipe and a connector tube;
    the connector tube comprising a generally circular tube, a threaded connector having at least one exterior flat, said tube and a generally annular standard fill connector permanently secured to the opposite end of said tube, said fill connector, said connector tube and said threaded connector comprising a unitary assembly;
    a vapor return conduit connected to said tank, said vapor return conduit including a second connector tube having a threaded connector with at least one exterior flat on said second connector tube; and
    a brace bar extending from said connector tube to said second connector tube and means for securing said brace bar against the flats of said connector tubes,
    whereby said connector tube may not be inadvertently disengaged or loosened during fueling operation.

2. A piping system as claimed in claim 1 wherein said securing means comprise U-bolts which have flats corresponding with the flats on said threaded connector tubes.

3. A piping system as claimed in claim 1 further comprising a brace bar extending from the threaded connector in said fuel conduit to the threaded connector in said vapor return conduit and clamp devices securing said brace bar to said threaded connectors.

4. A piping system for filling an underground fuel storage tank from a fill adaptor on the surface including a fill conduit and a vapor return conduit;
    each of said conduits including a connector tube and a threaded connector welded to said connector tube, said threaded connector including coupling means;
    and a brace bar extending between said threaded connectors including mating coupling means connected to said coupling means for securing said brace bar to said threaded connector such that any forces tending to rotate said connector tubes are resisted by said brace bar and said coupling means.

5. A piping system as claimed in claim 4 further comprising an annular spill bucket encircling said connector tube to recover any spillage around said connector tube during fueling.

6. In a piping system for an underground storage tank from a fill adapter on the surface including a fuel conduit extending from the tank to said fill adapter, said fuel conduit including a riser pipe and a connector tube:
    the connector tube comprising a tube of generally circular cross section, a threaded connector having at least one exterior flat, said tube and a generally annular standard fill connector permanently secured to the opposite end of said tube, said fill connector, said connector tube and said threaded connector comprising a unitary stainless steel assembly; and securing means connected to said flat for opposing rotation of said connector tube; and
    a spill bucket encircling said connector tube and removably secured to said connector tube and to said fill adapter to capture any fluid spillage around said connector tube;
    said spill bucket is being of resilient material to allow the spill bucket to be lowered over said connector and removed.

7. A piping system as claimed in claim 4 wherein a generally annular fill connector is welded to said connector tube, said fill connector, said connector tube and said threaded connector comprising a unitary assembly of stainless steel.

8. A piping system as claimed in claim 7 further comprising a brace bar extending from said threaded connector in said fuel conduit to said threaded connector in said vapor return conduit and U-bolts extending from said brace bar around the flats of said threaded connectors such that any rotating force applied to said fill adapters is resisted by said bar and said U-bolts.

9. A piping system for filling an underground fuel storage tank from fill adapters on the surface including a fuel conduit and a vapor return conduit, each of said conduits including a riser pipe connected to said tank;
    characterized in that fuel conduit and said vapor return conduit each comprise a connector tube and a threaded connector having flats thereon for turning said connector tube and a generally annular fill connector welded to the opposite end of said connector tube, each of said threaded connectors being operatively connected to one of said riser pipes;
    a brace bar having first and second flat sides, U-bolts extending from said brace bar around said flats, the first of said flat sides being secured against a flat on the threaded connector in said fuel conduit by one of said U-bolts and the second of said flat sides being secured against a flat on the threaded connector in said vapor return conduit by another of said U-bolts, said brace bar and said flats being arranged such that any rotating force applied to either said fuel conduit connector tube or said vapor conduit connector tube is resisted by said bar and said U-bolts.

10. A piping system as claimed in claim 9 wherein said U-bolts have flats corresponding with the flats on said threaded connector tubes.

11. A piping system for filling an underground fuel storage tank from fill adapters on the surface comprising a fuel conduit and a vapor return conduit connected between said tank and said fill adapters;
    said fuel conduit including a riser pipe connected to said tank and a fuel piping assembly connected to said riser pipe and to one of said fill adapters;
    said vapor return conduit including a riser pipe connected to said tank and a vapor return assembly connected to said riser pipe and to another of said fill adapters;
    each of said fuel piping assembly and said vapor return assembly including a connector tube, a threaded connector having flats for turning said connector tube welded to one end of said connector tube and a generally annular fill connector welded to the opposite end of said tube; and a brace bar extending from said fuel piping assembly to said vapor return assembly; and securing means extending from said brace bar around the flats of said threaded connectors such that any rotating force applied to said fill adapters is resisted by said brace bar and said securing means.

12. A piping system as claimed in claim 11 wherein said securing means comprise U-bolts.

13. A piping system as claimed in claim 11 further comprising a spill bucket of resilient material secured to at least one of said connector tubes, said bucket including an inner generally cylindrical wall surrounding said connector tube, an outer wall generally concentric with said inner wall and a bottom wall.

* * * * *